(No Model.)
A. LAFLAMME.
VEHICLE FOR SPREADING SAND.
No. 525,768. Patented Sept. 11, 1894.
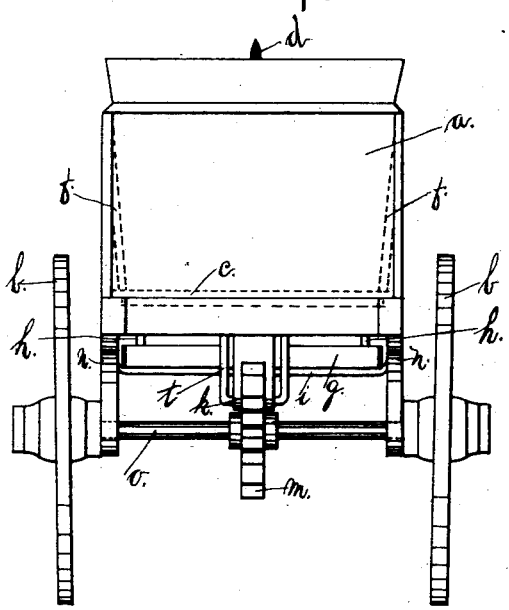
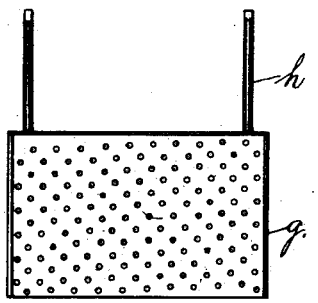
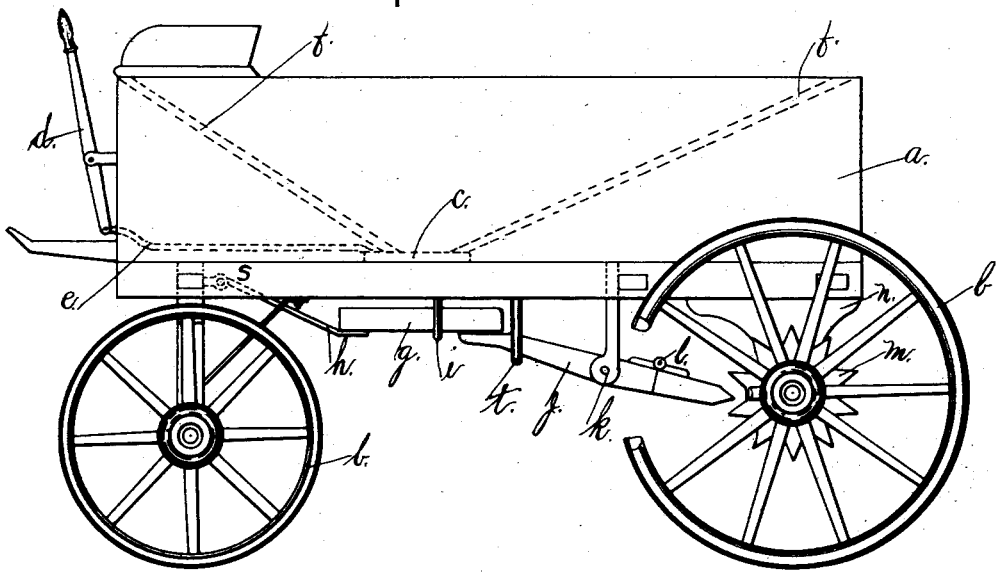
Witnesses:
E. H. Mason
G. A. Underhill
Inventor:
Andrew Laflamme
by his Attorney
R. P. Elliott

UNITED STATES PATENT OFFICE.

ANDREW LAFLAMME, OF NASHUA, NEW HAMPSHIRE.

VEHICLE FOR SPREADING SAND.

SPECIFICATION forming part of Letters Patent No. 525,768, dated September 11, 1894.

Application filed April 12, 1894. Serial No. 507,333. (No model.)

*To all whom it may concern:*

Be it known that I, ANDREW LAFLAMME, of Nashua, in the county of Hillsborough and State of New Hampshire, have invented certain new and useful Improvements in Vehicles for Spreading Sand, of which the following is a specification.

My invention relates to a vehicle for spreading sand upon icy walks, or other places made slippery by ice.

It has for its objects to provide a vehicle that will evenly and economically distribute sand as desired, and is so constructed that it can be operated by man or animal power.

Heretofore it has been necessary to dry the sand used before spreading the same, but in my improved vehicle wet sand can be used equally as well as dry, and with as good results.

In the drawings Figure 1—, represents a side elevation of my vehicle and the mechanism for spreading the sand. Fig. 2—, represents an end elevation with the forward gear left out. Fig. 3—, represents a plan of sheet iron pan upon which sand drops when falling through opening in the bottom of vehicle body.

Similar letters refer to similar parts throughout the several views.

*a*—, represents the body of vehicle; *b*—, *b*—, the wheels supporting the same. The rear wheels *b*—, *b*—, are secured to the axle *o*—, and said axle *o*—, revolves in the bearings *n*—, *n*—.

*c*—, represents a gate or valve which is used to close and regulate the size of opening in bottom of vehicle and is operated by the lever *d*—, through the medium of the rod *e*—.

*f*—, *f*—, *f*—, *f*—, in dotted lines represent the inclined bottom of vehicle. The bottom is inclined so that it will cause the sand to flow toward the opening in bottom of vehicle.

*g*—, represents a sheet iron pan which has its edges on front and back turned up so that the sand will not fall off sidewise and in front, and its bottom perforated with holes sufficiently large to permit the sand to fall through when the pan is jarred. Said pan *g*—, is prevented from moving horizontally by the rods *h*—, *h*—, one end of which is secured to pan *g*—, and the other end is pivoted to eyes *s*—, *s*—, secured to frame of vehicle body. The manner in which pan *g*—, is attached permits it to move vertically but not horizontally.

*i*—, is a rod passing under pan *g*—, and has its ends bent upward and secured to body of vehicle. Its object is to limit movement and form a rest for pan *g*—.

*j*—, is a lever oscillating upon a pivot near its center. One end of said lever extends under front edge of pan *g*—, and the other end extends backward to a position where points of toothed wheel *m*—, will come in contact with it when axle *o*—, is revolved in its bearings.

*t*—, represents a rod running under said lever *j*—, having its ends bent upward and secured to the under side of vehicle body, and is used to limit the movement of lever *j*—.

*k*—, represents the point or fulcrum upon which lever *j*—, oscillates.

*l*—, represents a hinge or joint in rear end of lever *j*—. Its purpose is to allow rear end of lever to swing upward independent of main portion of said lever when vehicle is moved backward.

*m*—, represents a toothed wheel secured to rear axle of vehicle and operates lever *j*—, as detailed above.

*n*—, *n*—, represents bearings attached to under side of body of vehicle, in which the axle *o*—, revolves.

The operation of my improved device is as follows:—After the body of vehicle is filled with sand, the valve *c*—, is opened by means of the lever *d*—, (which is controlled by the attendant,) a sufficient distance to permit the desired amount of sand to flow through opening and fall upon pan *g*—. Then when vehicle is propelled forward the points of toothed wheel *m*—, will come in contact with rear end of lever *j*—, thereby causing the forward end of said lever to forcibly come in contact with bottom of pan *g*—, jarring the same. Said jarring movement spreads the sand over the surface of pan *g*—, and causes it to drop through the perforations in bottom of said pan, thence onto the walk to be sanded.

What I claim is—

In a vehicle for spreading sand, the combination with a body having a bottom inclined toward an opening in its center, of the perforated pan $g$—, pivotally attached to the forward end of the body by means of the rods $h$—, $h$—, and the lever $j$—, oscillating upon the fulcrum $k$—, its forward end operating upon the under side of pan $g$—, the toothed wheel $m$—, secured to the rear axle and adapted to come in contact with rear end of lever $j$—, when vehicle is in motion, the hinged joint $l$—, near rear end of lever, and the bent rods $i$—, and $t$—, used to limit the movement of the pan $g$—, and lever $j$—, respectively, substantially as described.

In testimony whereof I have signed my name to this specification, in the presence of two subscribing witnesses, this 3d day of January, A. D. 1894.

his
ANDREW × LAFLAMME.
      mark

Witnesses:
 BERT LAFLAM,
 R. P. ELLIOTT.